United States Patent

[11] 3,619,065

| [72] | Inventor | Kenneth Leslie Agnew<br>Falconbridge, Ontario, Canada |
|---|---|---|
| [21] | Appl. No. | 687,078 |
| [22] | Filed | July 29, 1967 |
| [45] | Patented | Nov. 9, 1971<br>Continuation-in-part of application Ser. No. 293,729, July 9, 1963, now abandoned. |

[54] VERIFICATION OF THREE-DIMENSIONAL SHAPES BY MEANS OF CONTOUR LINES
2 Claims, 11 Drawing Figs.

[52] U.S. Cl................................................ 356/120,
356/156, 356/157, 356/165, 356/168
[51] Int. Cl................................................ G01b 11/30,
G01b 11/24
[50] Field of Search.................................... 356/71, 32,
157, 163, 165, 166, 168, 156, 120, 212, 237;
209/122

[56] References Cited
UNITED STATES PATENTS

| 2,759,814 | 8/1956 | Kegeles................... | 356/2 X |
|---|---|---|---|
| 2,253,054 | 8/1941 | Tuttle et al................ | 356/120 |
| 2,867,149 | 1/1959 | Goddard.................. | 356/120 |
| 3,264,932 | 8/1966 | Hendricks................ | 356/165 X |

OTHER REFERENCES

" New Photokeratoscope Utilizing a Hemispherical Object Surface" by Henry A. Knoll et al., Jnl. of Opt. Soc. of Am., Vol. 47, No. 3, March 1957, pp. 221–222

" Method for Keratographic Recording" by R. Plummer et al., Brit. J. Opthal., 1961, Vol. 45, pp. 312–315.

*Primary Examiner*—Ronald L. Wibert
*Assistant Examiner*—T. Major

ABSTRACT: This invention relates to an optical method of subsequently verifying similarity of shape of a three-dimensional object, or its reproduction, previously recorded on a two-dimensional record, such as a photograph. A projector, the shape, and a recording device are arranged in a plane, the straight lines connecting them in the aforesaid order forming a V with the shape at the intersection of the two arms of the V. Distortion of the initially projected lines (which must be at a substantial angle to the central plane of the V), produced by reflection from a master pattern, is either eliminated or reproduced by subsequent shapes, if similar, depending on the direction of the path of reprojection around the V. In some cases, distortion of the lines may be obtained by calculation rather than by actual reflection from a master pattern.

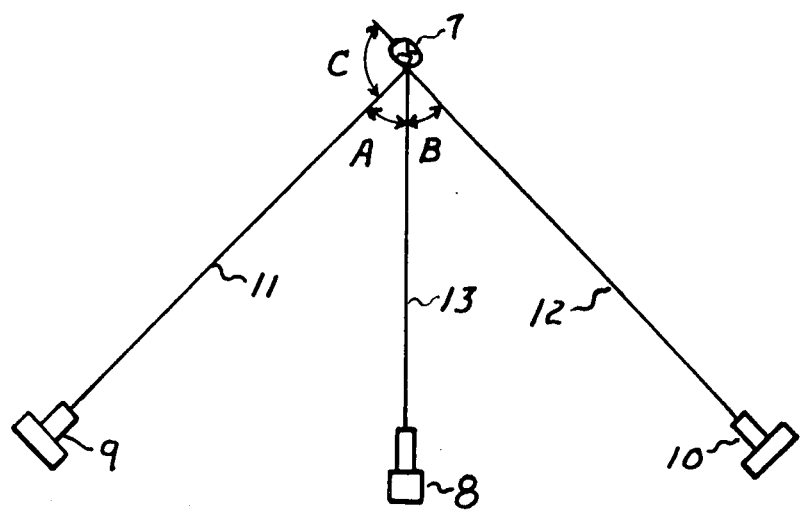
Fig. 1
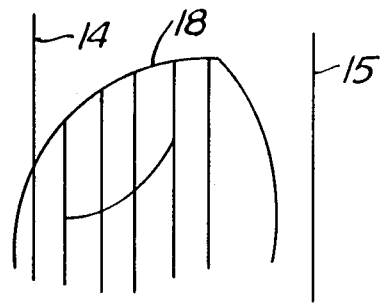
Fig. 6
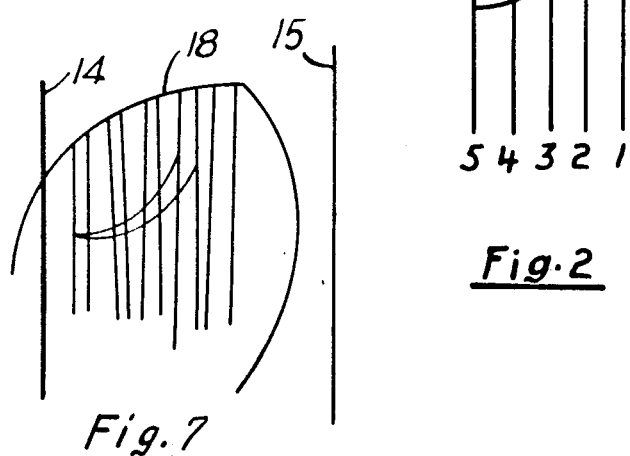
Fig. 2
Fig. 7 ness of the lens radius. It

VERIFICATION OF THREE-DIMENSIONAL SHAPES BY MEANS OF CONTOUR LINES

CROSS REFERENCES TO RELATED APPLICATIONS

This is a continuation-in-part of application Ser. No. 293,729 for Verification of Three-Dimensional Shapes by Means of Contour Lines, filed July 9, 1963, now abandoned.

BACKGROUND OF THE INVENTION

1. Field of the Invention

In general the field covered is the gaging in three dimensions of similarity of one shape to that of another, or of the same shape separated by a period of time. For instance, for identification purposes over a relatively short time interval, if straight vertical lines are projected so as to be superimposed on a person to produce a portrait, and somewhat later the distorted lines superimposed on this portrait are projected on the same person in a reverse direction around the V, as described above and below, replication of straight lines would be almost as positive a means of identification as fingerprints; or similar straight lines could be reprojected on the same person in the same direction around the V to produce distorted lines which could be compared with the original distorted lines. The method is particularly adapted to checking the similarity of the visible portions of complex assemblies such as carburetors or motors, and if a number of synchronized views are used, can be used to ensure similarity while in motion.

2 Description of the Prior Art

The common contour map is made to indicate elevations above or below a datum plane, and lines optically projected in planes at right angles to the line connecting the view and observer would produce such contours. HOwever, even minor concavities would interfere, as would portions approaching parallelism with the planes, where lines would be crowded and indistinguishable.

Another gaging method in use for judging optical lenses is that where concentric circles are projected on the lens and recorded along an axis coaxial with that of projection. The instrument used is called a photokeratoscope. In essence, and referring to FIG. 1 of this application, the effect produced is as though at 9 of this figure was projecting a series of dots of light in a line perpendicular to line 11 and parallel to the plane of the paper in the position shown, on shape 7, and then the projector in position 9 was revolved around a camera in position 8, the projector being rotated on its axis once during the revolution (as the moon rotates once as it revolves around the earth), the hypothetical string 11 cutting out a cone in space during the revolution: this would be an involved method with a minor return.

In the photokeratoscope, used for checking regularity of the tear layer surface of the eye, the spacing of the rings are recorded as a function of a known ball radius, and on subsequent projection on the lens of the eye the difference in spacing between the rings is an indication of the lens radius. It is thus possible to check the radius and departures from a spherical shape, of small objects; but no attempt is made to reproject lines distorted out of similarity on reflection from a master pattern, to reproduce the original lines, or to compare distorted lines reflected from a master pattern with subsequent lines distorted out of similarity on reflection, and I know of no other method than mine where this is done.

Both the method using lines projected in planes substantially perpendicular to the lines joining the shape and viewer, and the method using coaxial projection and reflection are specifically disclaimed as regards this application.

SUMMARY OF THE INVENTION

Lines, or a single line in some cases, are projected to impinge on a three-dimensional master pattern, and the resulting reflected lines distorted by the three-dimensional shape are recorded, the angle of the V formed by the projector, master pattern, and recorder being substantially less than 90° and greater than 0°. The legs of the V (with the master pattern being at the intersection) are not necessarily of the same length. The lines (line) originally projected onto the master pattern should be at a substantial angle to the plane of the V. Subsequent shapes are similar if reprojection of undistorted similar lines (line) in the same direction around the V produces similar distortion, or if reprojection of distorted lines (line) in the reverse direction around the V causes reproduction of undistorted lines (line). Similar is used in the geometrical sense, in that the master pattern may be larger or smaller than subsequent shapes, so long as all parts of the master pattern are proportionately enlarged or diminished in subsequent shapes.

BRIEF DESCRIPTION OF THE DRAWINGS

FIG. 1 is a diagrammatic plan of an arrangement used to obtain the contour lines. This shows two recorders and two angles A and B, although only one recorder need be used, the other being used to demonstrate different distortions of the same originally projected lines.

FIG. 2 is a view of a pattern projected to produce contour lines.

FIG. 6 is a record of the contour lines when correctly reprojected on an object having a shape similar to the original by either or both of the projectors, and viewed from the position of the camera shown in FIG. 5.

FIG. 7 is a record of the contour lines of FIGS. 3 and 4, when reprojected on an object having a shape dissimilar to the original, or in a different or dissimilar position with respect to the projectors, when viewed from the position of the camera shown in FIG. 5, illustrating the desireability of having originally projected lines at a substantial angle to the plane containing projector, shape and recorder, by coincidence at the bottom and left of the strongly curved line.

DESCRIPTION OF THE PREFERRED EMBODIMENTS

Referring first to FIG. 1, 8 is a projector throwing an image of a line, or lines, along a path 13 onto the three dimensional object 7, which may be considered the master pattern with reference to which subsequent verifications as to similarity of shape may be made. The lines shown as 1, 2, 3, 4, 5 and 6, FIG. 2, may be considered as illustrative of the type of lines projected, with the exception of the lower portion of line 6. These lines may be projected singly or as a group.

Figures 3, 4:
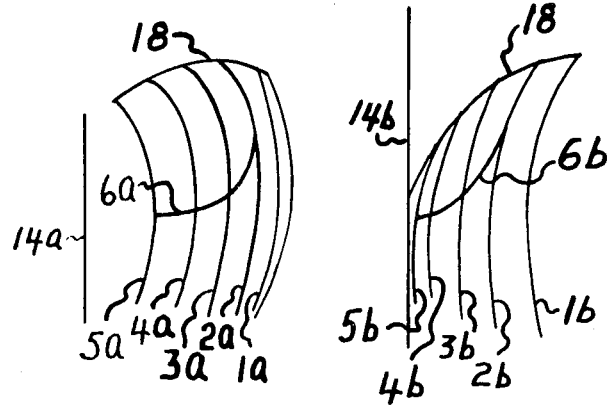
FIG. 3 is a composite record of the six resulting contour lines, together with a partial outline of the shape reflecting them, as viewed by the camera to the left of the projector.
FIG. 4 is a composite record of the six resulting contour lines, together with a partial outline of the shape reflecting them, as viewed by the camera to the right of the projector.

Images of the lines are reflected either by path 11 to camera 9, or by path 12 to camera 10, producing respectively images of contour lines 1a, 2a, 3a, 4a, 5a and 6a, at camera 9, or of contour lines 1b, 2b, 3b, 4b, 5b and 6b, at camera 10, or along both paths. 14a, FIG. 3, and 14b, FIG. 4, are images of a vertical string used as reference lines, and 18a and 18b are outlines of the object imaged.

Figure 5:
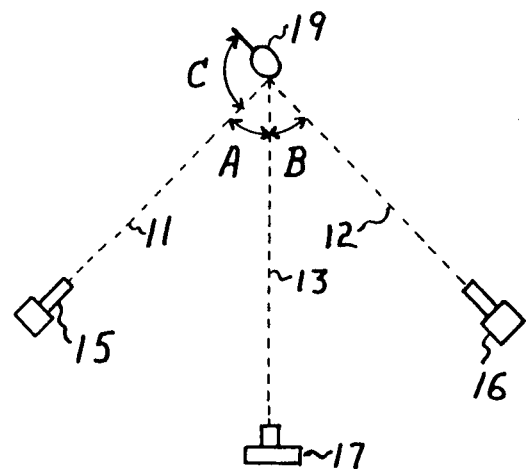
FIG. 5 is a diagrammatic plan of an arrangement used to reproject the images of the contour lines on to the object to be verified as to similarity of shape.

Referring now to FIG 5, if the record of FIG. 3 is reprojected by projector 15, along the path 11 that has the same angular (angle A) and coordinate relationship to object 19 as the same path in FIG. 1 from master pattern 7 to camera 9, a replica of the portion of FIG. 2 reflected by the object 19 appears at the camera, if objects 7, FIG. 1, and 19, FIG. 5, are similar. In other words, if, with angle A, similar parts of the reprojected lines are reflected from similar points on the object being gaged, a correct coordinate relationship can be shown, and this object is proven similar to the master pattern. This replica is shown as FIG. 6, in which 14 and 15 are vertical strings used as reference lines. An identical replica is obtained if the record of FIG. 4 is reprojected by projector 16 along the path 12 that has the same angular and coordinate relationship to object 19 as the same path in FIG. 1 from master pattern 7 to camera 10. If both FIG. 3 and FIG. 4 are reprojected simultaneously, under these circumstances, the replica produced at camera 17 is the same as for either.

If, however, the object 19, FIG. 5, is not similar to the master pattern 7, FIG. 1, the lines 1, 2, 3, 4 and 5, FIG. 2, will not be reproduced as vertical straight lines but will be distorted. Also, under these circumstances of a variation from similarity to the master pattern, if the original pattern is projected from the position of camera 17, FIG. 5, and recorded at the position of either projector 15 or 16, FIG. 5, the distortion of the lines will not be similar to that produced by the master pattern.

In addition, if the relative surfaces of the master pattern 7, FIG. 1, and the object 19 do not have the same relative positions, when both distorted images of lines, as in FIGS. 3 and 4, are projected, that is, if they do not have the same angular and coordinate relationships as in the original projection, the lines tend to be reproduced in different positions as shown in FIG. 7, even though the reproduction has a similar shape, but this is merely an application of the well-known range finder principle, and has no effect on the claims, being merely a convenient method of adjusting said angular and coordinate relationships when images of lines distorted by reflection from the master pattern have been obtained at two different angles.

In this description the word "similar" is used in a geometric sense; that is, the master pattern 7 and the object 19 may be different in overall size, but the relative proportions of the components of each are identical in shape and position, and the sizes of the images produced by the cameras and/or the projectors varied in proportion.

Normally, I prefer to use narrow-angle lenses in the cameras and projectors, to obtain substantially parallel rays along which the lines are projected, as greater depth of focus is obtained, where lenses are used, but this is not necessary condition, although otherwise greater care is required to adjust distances so that similar divergence or convergence of rays with respect to the shape are maintained on reprojection and reviewing.

I also prefer to use straight lines, although this is not a necessary condition, for the original projection. However, the left-hand lower portion of curved line 6, FIG. 2, as reproduced in the distorted replica, FIG. 7, shows that the lines must be at a substantial angle to the plane of the V containing the camera, the three-dimensional shape, and the projector, or the distortion produced in the replica from a misshapen or misplaced reproduction is not appreciable.

In the above description, static conditions are assumed for the object being verified. In addition, by using a contour line from a master pattern, a shape being rolled or extruded may be verified while in motion. In such a case, where the three-dimensional shape is outlined by parallel sheets, straight in one dimension, and therefore uniform in cross section, the words "projected lines" and "contour lines" are to be understood in the singular sense, as only one line need be projected to verify uniformity of one visible face of such a shape.

In FIG. 5, illustrating verification of the object 19, I have described 15 and 16 as projectors and 17 as a viewing camera. These designations may be reversed, with 17 considered as projecting the original pattern, FIG. 2, and either one or both 17 and/or 16 as cameras in which the replica may be verified against the contour lines as shown in FIGS. 3 and 4.

Figure 8:
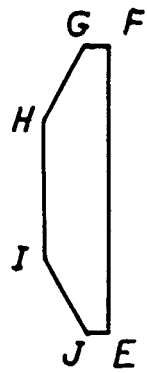
FIG. 8 is the end section of a bar with parallel sides.
Figure 9:
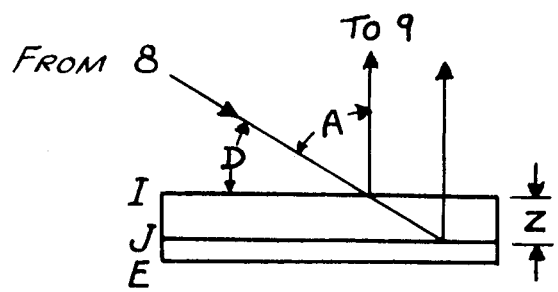
FIG. 9 is a view, in elevation, of the same bar as shown in FIG. 10.
Figures 10, 11:
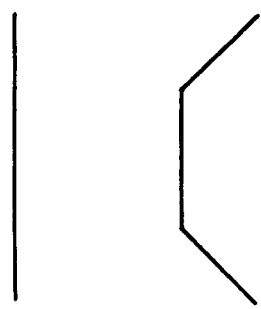
FIG. 10 is a view of a straight line which is projected from position 8 of FIG. 9, along a sheet of energy perpendicular to the plane of the drawing, to impinge on the surface GHIJ of the bar, as shown in FIG. 9.
FIG. 11 is a view of the straight line after distortion by reflection from the bar of FIG. 9 to impinge on a viewer at position 9.

In some cases, for simpler three-dimensional shapes, contour lines may be drawn from calculations, instead of being photographed on a master pattern, and then reprojected along light rays, as described above, to verify a three-dimensional shape. As an example, diagrams of an end section, FIG. 8, outlined as EFGHIJ; elevation, FIG. 9, formed by parallel planes; FIG. 10, the image of a straight line normal to the paper, projected from 8; and FIG. 11, the resulting single distorted contour line produced at 9 when the straight line is projected at an angle of 180° −A or 180° −B, FIG. 1, onto the surface GHIJ, and recorded by reflection normal to surface HI—all of these illustrate that where surfaces are calculable the contour lines can also be readily drawn. If a straight line is originally projected, at an angle between 0° and 90°, onto a plane normal to the lines connecting object and image, assuming the plane to be material, a straight line will be reflected, and if this plane is considered to touch, and reflect, at, say, the portion of the object nearest the image, the amount of distortion, shown in FIG. 9 as the distance between the two vertical lines to 9, will be equal to Z/tan D, where Z is the distance, at right angles, beneath the plane, and tan D is the angle at which the projected straight line would touch the plane, that is, 180° −A or 180° −B in the cases of FIGS. 1 and 5 of the application. These could also be drawn by projective geometry, and even a relatively complicated device such as a carburetor could be described by these special contour lines produced by calculation, although probably more tediously than by photography. More complicated shapes, such as short term identification portraiture, would best be carried out photographically. With multiple lines where there may be divergence and convergence of the sheets of energy projecting the lines, each line would require individual adjustment for varying incident angle D; this would not be necessary if lines were projected along substantially parallel sheets, as with a narrow angle (telephoto) lens.

Photoelectric cells may, of course, be used as part of the verification circuit; and a moving spot of light, tracing out lines, as lines are described above, may be used.

Having described the invention, what is claimed as new is:

1. A method of verifying the similarity of shape of a three-dimensional object to that of a three-dimensional master object comprising the steps of:
    optically projecting an incident light beam carrying a pattern of lines upon the three-dimensional master object and producing a pattern of contour lines thereon indicative of the contours of said master object,
    recording said contour lines reflected from said master object at an angle from said incident beam that is substantially greater than 0° and less than 90°,
    orienting an object whose shape is to be verified in the precise position occupied by said master object in relation to the recording device,
    projecting the recorded contour lines upon the object to be verified from the said precise position in which it was recorded,
    viewing the reflection of the recorded contour lines from the precise relative position originally occupied by the projected pattern of lines whereby the similarity may be verified if the resulting pattern viewed is similar to the line pattern originally projected.

2. A method of verifying the similarity of shape of a three-dimensional object to that of a desired master shape comprising the steps of:
    calculating the contour lines that would result from a projection and recording of a known pattern of lines upon a master object at a predetermined angle substantially greater than zero but less than 90° with respect to the projected known pattern,
    making an optical recording of said calculated contour,
    projecting said calculated contour recording upon an object to be verified from the precise position which the actual recording would have been made, and viewing the reflection of the calculated contour recording from the precise position from which the known pattern would have been projected whereby the similarity may be verified if the resulting pattern viewed is similar to the known pattern of lines used to calculate the contour lines.

* * * * *